US00RE47262E

(19) United States
(12) Reissued Patent
Chung

(10) Patent Number: US RE47,262 E
(45) Date of Reissued Patent: Mar. 5, 2019

(54) MOBILE PHONE MONITOR

(71) Applicant: Samsung Electronics Co., Ltd., Suwon-si (KR)

(72) Inventor: Jae-Woong Chung, Seongnam-Si (KR)

(73) Assignee: Samsung Electronics Co., Ltd., Suwon-si (KR)

(21) Appl. No.: 29/487,577

(22) Filed: Apr. 10, 2014

Related U.S. Patent Documents

Reissue of:
(64) Patent No.: Des. 671,939
Issued: Dec. 4, 2012
Appl. No.: 29/406,258
Filed: Nov. 11, 2011

(30) Foreign Application Priority Data

Jul. 29, 2011 (KR) ..... 30-2011-0031691

(51) LOC (11) Cl. ..... 14-02
(52) U.S. Cl.
USPC ..... D14/374; D14/130
(58) Field of Classification Search
USPC ..... D14/336, 337, 341, 125, 126, 130, 217, D14/434, 239, 240; D06/308, 311;
(Continued)

(56) References Cited

U.S. PATENT DOCUMENTS

D490,420 S * 5/2004 Solomon et al. ..... D14/341
D504,889 S * 5/2005 Andre et al. ..... D14/341
(Continued)

*Primary Examiner* — Philip S Hyder
(74) *Attorney, Agent, or Firm* — NSIP Law

(57) CLAIM

[The] *I claim the* ornamental design for a mobile phone monitor, as shown and described.

DESCRIPTION

*This design patent application is a reissue of U.S. Design Pat. No. D671,939, issued Dec. 4, 2012, which claims the benefit under 35 U.S.C. Sections 119 and 172 of Korean Patent Application Serial No. 30-2011-0031691, filed Jul. 29, 2011, which is hereby incorporated by reference in its entirety into this application.*

*FIG. 9 is a front perspective view of a further embodiment of a mobile phone monitor;*

*FIG. 10 is a front view thereof;*

*FIG. 11 is a rear view thereof;*

*FIG. 12 is a left-side view thereof;*

*FIG. 13 is a right-side view thereof;*

*FIG. 14 is a top view thereof;*

*FIG. 15 is a bottom view thereof; and,*

*FIG. 16 is a rear perspective view of the mobile phone monitor of FIG. 9, in which a mobile phone in broken lines is provided to illustrate an example of how the mobile phone may be docked to the mobile phone monitor of FIG. 9.*

*The broken lines in the figures show portions of the mobile phone monitor which form no part of the claimed design.*

(Continued)

NEW

Figure 1:
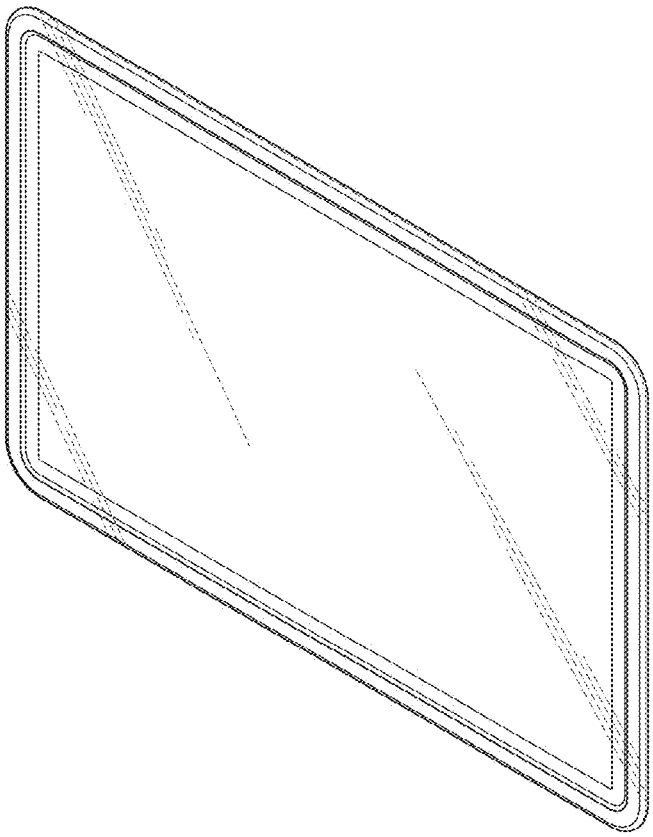
FIG. 1 is a *front* perspective view of a mobile phone monitor *showing my new design*.
Figure 2:
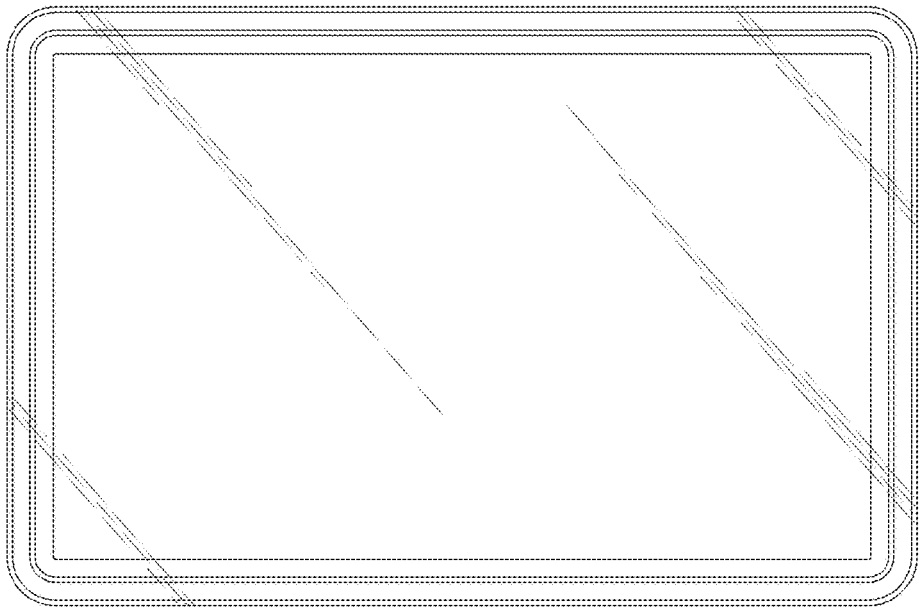
FIG. 2 is a front view [of the mobile phone monitor of FIG. 1] *thereof*.
Figure 3:
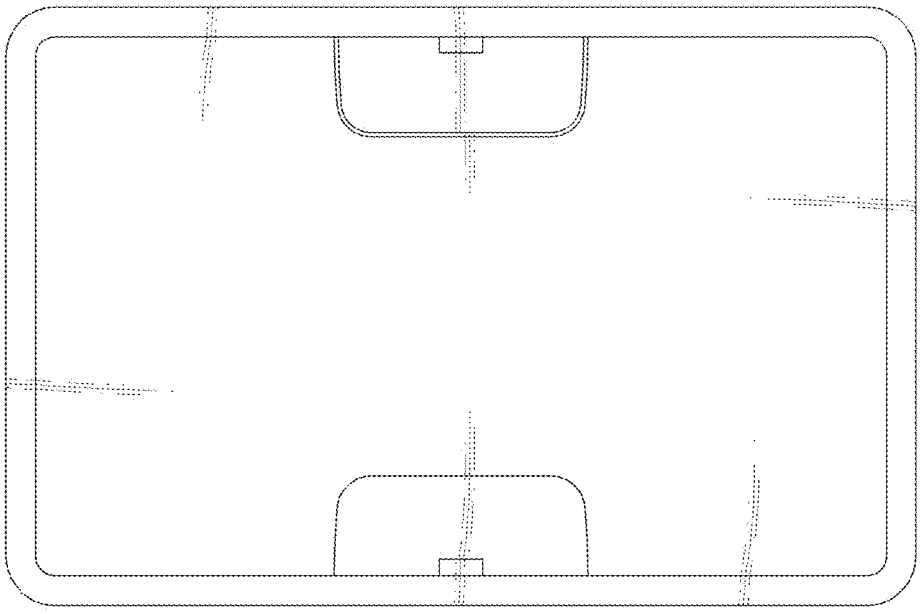
FIG. 3 is a rear view [of the mobile phone monitor of FIG. 1] *thereof*.
Figure 4:
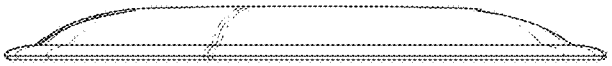
FIG. 4 is a left-side view [of the mobile phone monitor of FIG. 1] *thereof*.
Figure 5:
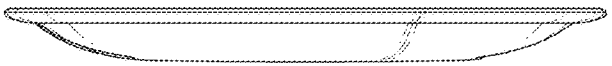
FIG. 5 is a right-side view [of the mobile phone monitor of FIG. 1] *thereof*.
Figure 6:
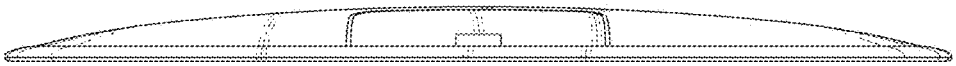
FIG. 6 is a top [plan] view *thereof* of the mobile phone monitor of FIG. 1.
Figure 7:
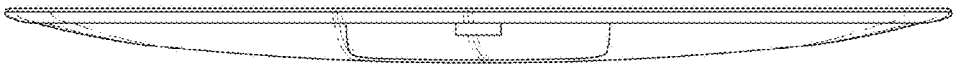
FIG. 7 is a bottom [plan] view [of the mobile phone monitor of FIG. 1; and,] *thereof;*
Figure 8:
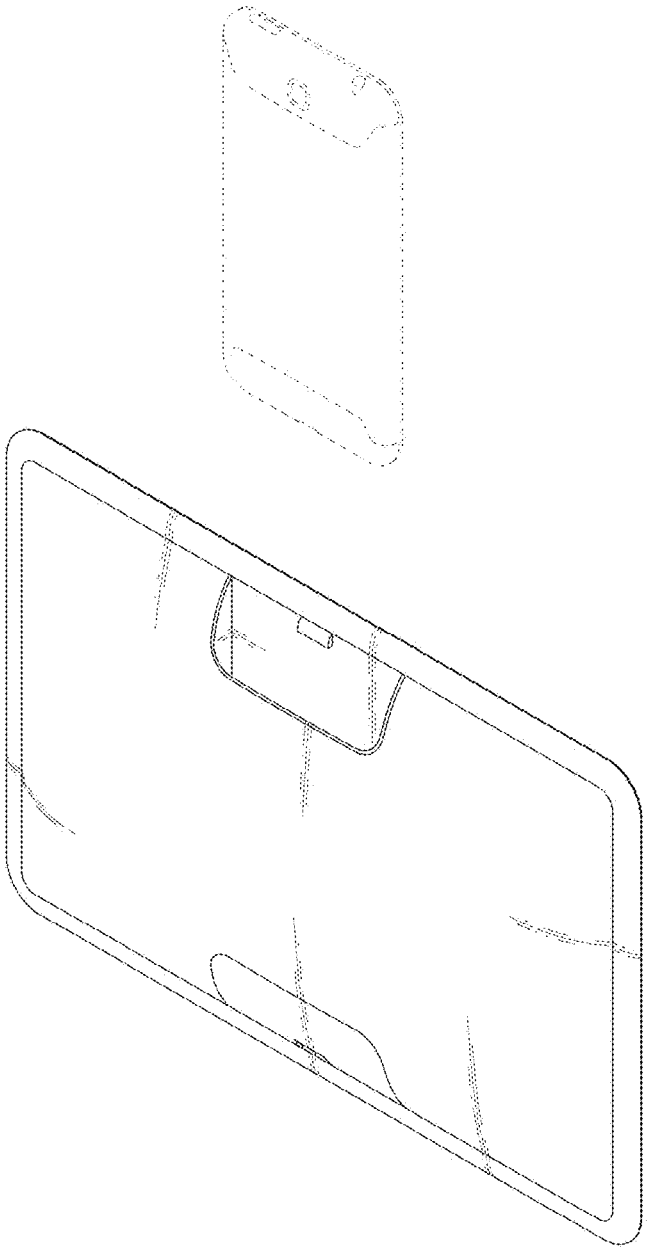
FIG. 8 is a rear perspective view of the mobile phone monitor of FIG. 1, in which a mobile phone [shown] in broken lines [for environmental purposes only and forms no part of the claimed design illustrates] *is provided to illustrate* an example of how the mobile phone may be [docketed in] *docked to* the mobile phone monitor of FIG. 1[.]

*The broken line showing of the mobile phone in FIGS. 8 and 16 is for environmental purposes only and forms no part of the claimed design.*

1 Claim, 12 Drawing Sheets

Matter enclosed in heavy brackets [ ] appears in the original patent but forms no part of this reissue; matter printed in italics indicates the additions made by reissue.

(58) Field of Classification Search
USPC ..... 341/12; 345/156, 173, 174, 104; 361/697.01, 679.23; 349/2, 11, 58
See application file for complete search history.

(56) References Cited

U.S. PATENT DOCUMENTS

D540,327 S * 4/2007 Wong et al. ..... D14/434
D550,615 S * 9/2007 Tong ..... D13/107
D552,085 S * 10/2007 Andre et al. ..... D14/217
D568,297 S * 5/2008 Andre et al. ..... D14/217
D575,786 S * 8/2008 Solomon ..... D14/434
D595,265 S * 6/2009 Andre et al. ..... D14/217
D617,793 S * 6/2010 Chiang et al. ..... D14/341
D624,051 S * 9/2010 Shimizu et al. ..... D14/217
D625,291 S * 10/2010 Andre et al. ..... D14/217
D625,292 S * 10/2010 Andre ..... D14/217
D629,373 S * 12/2010 Kim et al. ..... D14/126
D634,304 S * 3/2011 Andre et al. ..... D14/217
D636,360 S * 4/2011 Fantaay ..... D14/129
D639,266 S * 6/2011 DeLorenzo et al. ..... D14/142
D644,228 S * 8/2011 Corsini et al. ..... D14/434
D648,339 S * 11/2011 O'Neil et al. ..... D14/434
D656,935 S * 4/2012 Jones ..... D14/341
D671,940 S * 12/2012 Kim ..... D14/130
2003/0236102 A1* 12/2003 Kawai et al. ..... 455/550.1
2012/0054401 A1* 3/2012 Cheng ..... G06F 1/1632 710/304
2012/0274656 A1* 11/2012 Kang ..... G06F 1/1632 345/619

* cited by examiner

NEW
FIG. 9
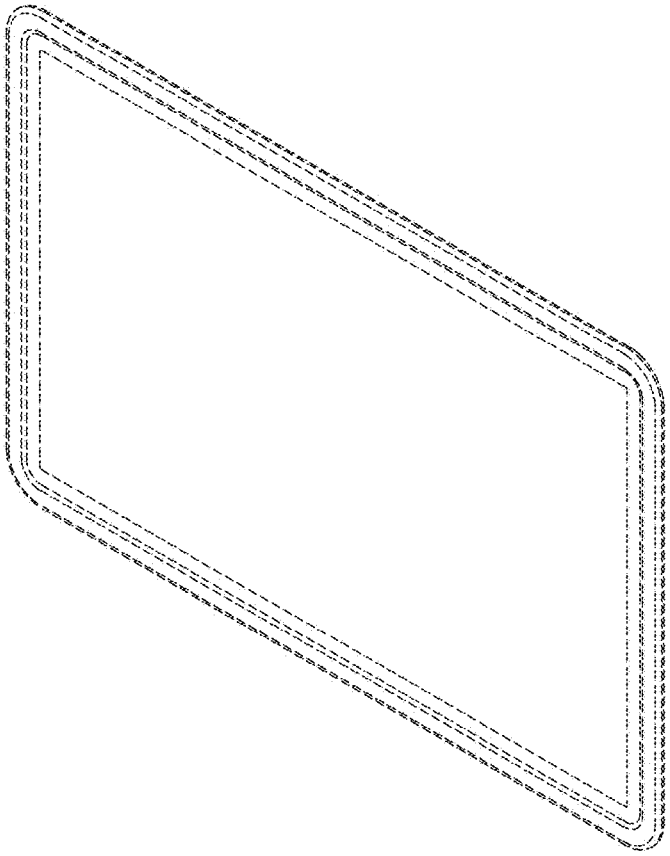

NEW
FIG. 10
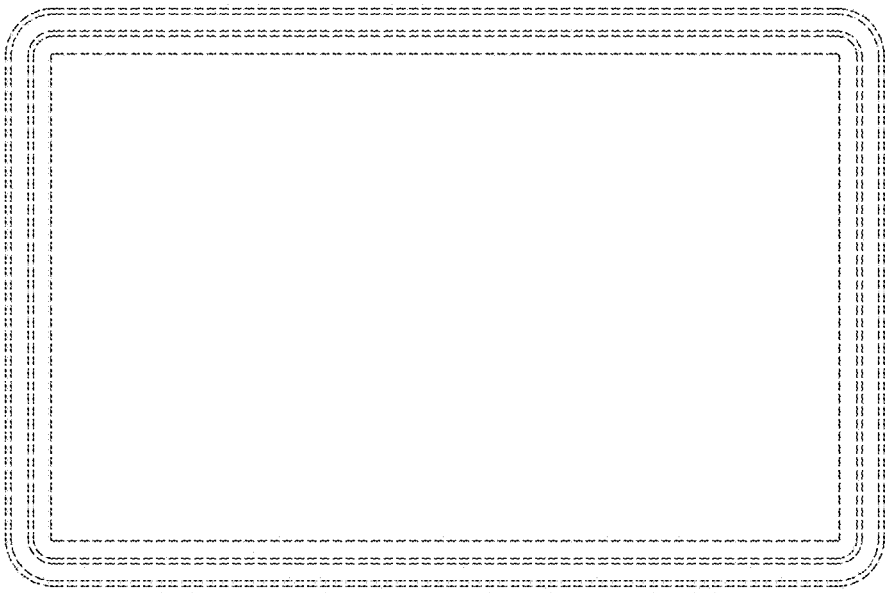

NEW
FIG. 11
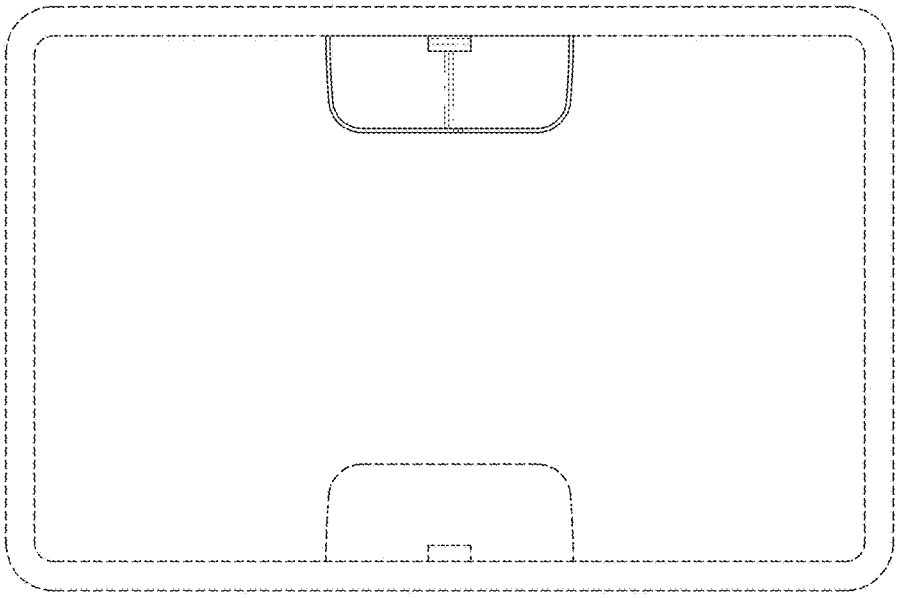

NEW
FIG. 12
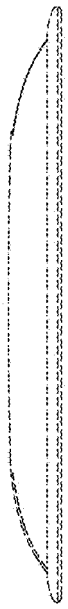
NEW
FIG. 13
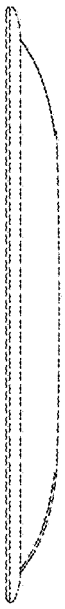

NEW
FIG. 14
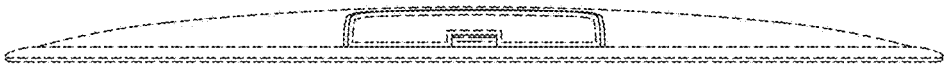
NEW
FIG. 15
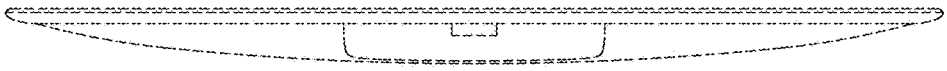

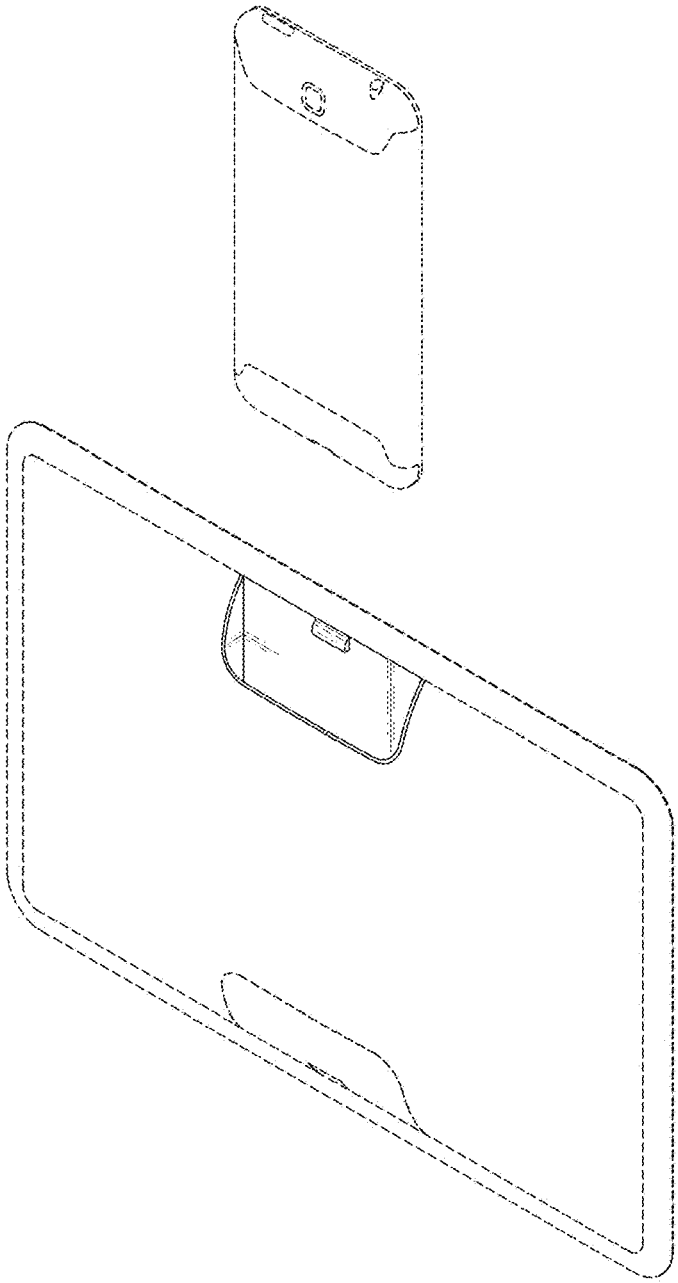

NEW
FIG. 16